(12) United States Patent
Waisbard

(10) Patent No.: US 7,903,820 B2
(45) Date of Patent: Mar. 8, 2011

(54) KEY PRODUCTION SYSTEM

(75) Inventor: Erez Waisbard, Or-Yehuda (IL)

(73) Assignee: NDS Limited, Staines, Middlesex (GB)

( * ) Notice: Subject to any disclaimer, the term of this patent is extended or adjusted under 35 U.S.C. 154(b) by 921 days.

(21) Appl. No.: 11/810,023

(22) Filed: Jun. 4, 2007

(65) Prior Publication Data

US 2008/0085003 A1 Apr. 10, 2008
US 2009/0116648 A9 May 7, 2009

(30) Foreign Application Priority Data

Oct. 5, 2006 (IL) .......................................... 178488

(51) Int. Cl.
*H04L 9/08* (2006.01)
*G06F 21/00* (2006.01)
*G06F 7/04* (2006.01)

(52) U.S. Cl. ............................. 380/278; 713/186; 726/26
(58) Field of Classification Search .................. 380/287; 713/186; 726/26
See application file for complete search history.

(56) References Cited

U.S. PATENT DOCUMENTS

| 6,799,270 | B1 | 9/2004 | Bull et al. | |
|---|---|---|---|---|
| 2003/0044017 | A1* | 3/2003 | Briscoe | 380/277 |
| 2005/0114666 | A1* | 5/2005 | Sudia | 713/175 |
| 2006/0036516 | A1 | 2/2006 | Glebe | |
| 2006/0059333 | A1* | 3/2006 | Gentry et al. | 713/156 |
| 2006/0248334 | A1* | 11/2006 | Ramzan et al. | 713/156 |
| 2006/0288224 | A1* | 12/2006 | Won et al. | 713/181 |
| 2007/0074036 | A1* | 3/2007 | Ramzan et al. | 713/176 |
| 2007/0127719 | A1* | 6/2007 | Selander et al. | 380/277 |
| 2007/0150744 | A1* | 6/2007 | Cheng et al. | 713/185 |
| 2008/0307221 | A1* | 12/2008 | Horita et al. | 713/156 |

FOREIGN PATENT DOCUMENTS

| WO | WO 00/31956 | 6/2000 |
|---|---|---|
| WO | WO 2005/038818 A1 | 4/2005 |
| WO | WO 2007/107976 A2 | 9/2007 |

OTHER PUBLICATIONS

Firdous Kausar, "Secure Group Communication with Self-healing and Rekeying in Wireless Sensor Networks" (MSN 2007, LNCS 4864, pp. 737-748, 2007).
DRM Specification OMA-TS-DRM-DRM-V2_0-20060303-A, Approved Version 2.0, p. 6 (Open Mobile Alliance, Mar. 3, 2006).

* cited by examiner

*Primary Examiner* — Techane J Gergiso
(74) *Attorney, Agent, or Firm* — Husch Blackwell LLP

(57) ABSTRACT

A key production system to determine a cryptographic key for a selected cryptoperiod being later than or equal to a cryptoperiod-A, and earlier than or equal to a different cryptoperiod-B, the system including a first receiver to receive a first key-component, associated with cryptoperiod-A, forming part of a first hash-chain progressing via a first one-way function, progressive key-components corresponding to later cryptoperiods, a second receiver to receive a second key-component, associated with cryptoperiod-B, forming part of a second hash-chain progressing via a second one-way function, progressive key-components corresponding to earlier cryptoperiods, first and second key-component determination modules to determine key-components in the first hash-chain and the second hash-chain, respectively, for the selected cryptoperiod, and a key determination module to determine the cryptographic key based on the key-components in the first and second hash chain for the selected cryptoperiod. Related methods and apparatus are also included.

14 Claims, 12 Drawing Sheets

KEY PRODUCTION SYSTEM

FIELD OF THE INVENTION

The present invention relates to key production.

RELATED APPLICATION INFORMATION

The present application claims priority from Israel Patent Application S/N 178488 of NDS Limited, filed Oct. 5, 2006.

BACKGROUND OF THE INVENTION

By way of introduction, content issued by a content provider is typically encrypted using a cryptographic key. The cryptographic key is typically changed periodically and frequently, every cryptoperiod, in order to prevent key attacks leading to gaining unauthorized access to the content. In order to efficiently store a collection of keys that change over time, it is generally necessary to generate the keys by deriving a series in a one-way manner. As will be explained in more detail below, only the last issued key needs to be retained by the content consuming device and previous keys can then be derived from the last issued key. An example of key generation is described in section 7.3 of a document entitled "DRM Specification, Approved Version 2.0—3 Mar. 2006" issued by the Open Mobile Alliance of 4275 Executive Square, Suite 240, La Jolla, Calif. 92037, USA or via the website at www.openmobilealliance.org.

Reference is now made to FIGS. 1 and 2. FIG. 1 is a partly pictorial, partly block diagram view of a hash-chain 10 used in key-production. FIG. 2 is a partly pictorial, partly block diagram view of keys 12 being issued after a subscription.

The hash-chain 10 has a root key 14, which is input to the function f, thereby producing a key $X_i$. The key $X_i$ is in turn input to the function f, thereby producing a key $X_{i-1}$. The process is then continued until the hash-chain 10 is large enough for the needs of the application giving keys 12 (for example, but not limited to, keys $X_0$, $X_1$, $X_2$, $X_3$ and so on) whereby one of the keys 12 is generally issued at a time. The function f, is typically a cryptographic one-way function.

The root key 14 of the series of the hash-chain 10 is generally kept by the deriving side, for example, but not limited to, a broadcasting Headend or the Rights Issuer. The Rights Issuer then issues keys periodically, typically starting from the last key in the series, $X_0$ in the example of FIG. 1, and then continuing issuing new keys back one-by-one towards the root key 14 so that the order of issuance is in the opposite direction to the order of derivation.

The first key issued to the subscribers is the key $X_0$. The key $X_0$ is suitable as a decryption key for content issued in the first time period (January). Similarly, in the next time period (February), the key $X_1$ is issued to the subscribers to decrypt content issued in February. In the following time period (March), a key $X_2$ is issued to the subscribers to decrypt content issued in March, and so on. It will be appreciated that when the subscribers hold key $X_1$, the subscribers no longer need to hold the key $X_0$, as the key $X_0$ can be determined from the key $X_1$ using the function f. Similarly, when the subscribers hold the key $X_2$, the subscribers no longer need to hold the keys $X_1$ and $X_0$, as the keys $X_1$ and $X_0$ can be determined from the key $X_2$ using the function f.

Reference is now made to FIG. 2. A subscriber (not shown) subscribes in March and receives the key $X_2$ in March, the key $X_3$ in April and the key $X_4$ in May.

Reference is now made to FIG. 3, which is a partly pictorial, partly block diagram view of prior keys 16 being generated from a current key 18. In June, the subscriber receives the key $X_5$. The keys $X_0$, $X_1$, $X_2$, $X_3$ and $X_4$ can all be determined from the key $X_5$ using the function f. The keys $X_0$ and $X_1$ allow the subscriber to decrypt content issued in January and February, respectively. However, the subscriber only began subscribing in March. Therefore, the subscriber is gaining free access to the January and February content.

Therefore, when derived keys are shared by many clients, for example, but not limited to, access keys to a service that is broadcast and stored, then everyone included in the subscription for a service receives all the current keys, but have the ability to derive all the past keys, even for periods for which the clients were not subscribed.

The following reference is also believed to represent the state of the art:

Israel unpublished patent application 174494 of NDS Limited entitled "Period Keys".

The disclosures of all references mentioned above and throughout the present specification, as well as the disclosures of all references mentioned in those references, are hereby incorporated herein by reference.

SUMMARY OF THE INVENTION

The present invention seeks to provide an improved key production system.

The system of the present invention, in preferred embodiments thereof, includes a key production system based on two hash-chain series. The values of each hash-chain are associated with cryptoperiods such that one of the hash-chains has values (for example, $Y_0$, $Y_1$, $Y_2$, $Y_3$) which progress via a first one-way function wherein progressive values correspond to later cryptoperiods (so that the order of issuance is in the same direction as the order of derivation) and the other hash-chain has values (for example, $X_3$, $X_2$, $X_1$, $X_0$) which progress via a second one-way function wherein progressive values correspond to earlier cryptoperiods (so that the order of issuance is in the opposite direction to the order of derivation). For a selected cryptoperiod i, the cryptographic key ($Z_i$) is based on a value in each hash-chain for the selected cryptoperiod (for example, $X_i$ and $Y_i$). Therefore, the values of the hash-chained are termed "key-components".

The cryptographic key, $Z_i$, is preferably, determined based on the value $X_i$ in one hash-chain and the value $Y_i$ in the other hash-chain, for the selected cryptoperiod. In general, the function used to determine $Z_i$ should not allow computing the values $X_i$ from $Z_i$ and $Y_i$ and preferably not $Y_i$ from $Z_i$ and $X_i$, for a cryptoperiod i.

Therefore, when a client subscribes to a service, for example, in time-period k, the client receives a key-component from each hash-chain for the current cryptoperiod, for example, $X_k$ and $Y_k$. Each cryptoperiod, m, during subscription, the client receives a key-component $X_m$ from the hash-chain which progresses toward the root for the cryptoperiod. The key-component $Y_m$ for the cryptoperiod for the hash-chain which progresses away from the root can be determined by the client based on the originally issued key-component, $Y_k$. The cryptographic key $Z_m$ is determined using the appropriate key-components of each hash-chain, namely, $X_m$ and $Y_m$.

Therefore, the client can generally only calculate the cryptographic key Z, for cryptoperiods later than or equal to k, but earlier than or equal to m.

There is thus provided in accordance with a preferred embodiment of the present invention a key production system to determine a cryptographic key for a selected cryptoperiod, the selected cryptoperiod being later than or equal to a cryptoperiod There is also provided in accordance with still another preferred embodiment of the present invention a, and earlier than or equal to a cryptoperiod B, the cryptoperiod There is also provided in accordance with still another preferred embodiment of the present invention a being different from the cryptoperiod B, the system including a first receiver to receive a first key-component associated with the cryptoperiod There is also provided in accordance with still another preferred embodiment of the present invention a, the first key-component forming part of a first hash-chain having a plurality of key-components such that the first hash-chain progresses via a first one-way function, progressive ones of the key-components in the first hash-chain corresponding to later cryptoperiods, a second receiver to receive a second key-component associated with the cryptoperiod B, the second key-component forming part of a second hash-chain having a plurality of key-components such that the second hash-chain progresses via a second one-way function, progressive ones of the key-components in the second hash-chain corresponding to earlier cryptoperiods, a first key component determination module to determine one of the key-components in the first hash-chain for the selected cryptoperiod, a second key component determination module to determine one of the key-components in the second hash-chain for the selected cryptoperiod, and a key determination module to determine the cryptographic key based on the one key-component in the first hash chain for the selected cryptoperiod and the one key component in the second hash-chain for the selected cryptoperiod.

Further in accordance with a preferred embodiment of the present invention the first key component determination module is operative to determine the one key-component in the first hash-chain for the selected cryptoperiod based on applying the first one-way function, at least once, to the first key component.

Still further in accordance with a preferred embodiment of the present invention the second key component determination module is operative to determine the one key-component in the second hash-chain for the selected cryptoperiod based on applying the second one-way function, at least once, to the second key component.

Additionally in accordance with a preferred embodiment of the present invention, the key determination module is operative to determine the cryptographic key by performing a cryptographic hash function on the concatenation of the one key-component in the first hash chain for the selected cryptoperiod with the one key component in the second hash-chain for the selected cryptoperiod.

Moreover, in accordance with a preferred embodiment of the present invention the first one-way function is the same as the second one-way function.

There is also provided in accordance with still another preferred embodiment of the present invention a key production system to determine a cryptographic key for a selected cryptoperiod, the selected cryptoperiod being later than or equal to a cryptoperiod There is also provided in accordance with still another preferred embodiment of the present invention a, and earlier than or equal to a cryptoperiod B, the cryptoperiod There is also provided in accordance with still another preferred embodiment of the present invention a being different from the cryptoperiod B, the system including a first receiver to receive a first key-component associated with the cryptoperiod There is also provided in accordance with still another preferred embodiment of the present invention a, the first key-component forming part of a first hash-chain having a plurality of key-components such that the first hash-chain progresses via a first one-way function, progressive ones of the key-components in the first hash-chain corresponding to later cryptoperiods, a second receiver to receive a second key-component associated with the cryptoperiod B, the second key-component forming part of a second hash-chain having a plurality of key-components such that the second hash-chain progresses via a second one-way function, progressive ones of the key-components in the second hash-chain corresponding to earlier cryptoperiods, a first key component determination module to determine one of the key-components in the first hash-chain for the selected cryptoperiod based on applying the first one-way function, at least once, to the first key component, a second key component determination module to determine one of the key-components in the second hash-chain for the selected cryptoperiod based on applying the second one-way function, at least once, to the second key component, and a key determination module to determine the cryptographic key based on the one key-component in the first hash chain for the selected cryptoperiod and the one key component in the second hash-chain for the selected cryptoperiod.

There is also provided in accordance with still another preferred embodiment of the present invention a key component production system to determine cryptographic key components for use in determining a cryptographic key for a selected cryptoperiod, the system including a first hash-chain module to determine a first key-component associated with the selected cryptoperiod such that the first key-component forms part of a first hash-chain having a plurality of key-components, the first hash-chain progressing via a first one-way function, progressive ones of the key-components in the first hash-chain corresponding to later cryptoperiods, a second hash-chain module to determine a second key-component associated with the selected cryptoperiod such that the second key-component forms part of a second hash-chain having a plurality of key-components, the second hash-chain progressing via a second one-way function, progressive ones of the key-components in the second hash-chain corresponding to earlier cryptoperiods, a key determination module to determine the cryptographic key for the selected cryptoperiod based on the first key-component and the second key-component, and a communication module to enable transfer of the first key-component and the second-key component to a plurality of devices for use in determination of the cryptographic key for the selected cryptoperiod.

There is also provided in accordance with still another preferred embodiment of the present invention a key production method to determine a cryptographic key for a selected cryptoperiod, the selected cryptoperiod being later than or equal to a cryptoperiod There is also provided in accordance with still another preferred embodiment of the present invention a, and earlier than or equal to a cryptoperiod B, the cryptoperiod There is also provided in accordance with still another preferred embodiment of the present invention a being different from the cryptoperiod B, the method including receiving a first key-component associated with the cryptoperiod There is also provided in accordance with still another preferred embodiment of the present invention a, the first key-component forming part of a first hash-chain having a plurality of key-components such that the first hash-chain progresses via a first one-way function, progressive ones of the key-components in the first hash-chain corresponding to later cryptoperiods, receiving a second key-component associated with the cryptoperiod B, the second key-component forming part of a second hash-chain having a plurality of key-components such that the second hash-chain progresses via a second one-way function, progressive ones of the key-components in the second hash-chain corresponding to earlier cryptoperiods, determining one of the key-components in the first hash-chain for the selected cryptoperiod, determining one of the key-components in the second hash-chain for the selected cryptoperiod, and determining the cryptographic key based on the one key-component in the first hash chain for the selected cryptoperiod and the one key component in the second hash-chain for the selected cryptoperiod.

Further in accordance with a preferred embodiment of the present invention the one key-component in the first hash chain for the selected cryptoperiod is determined based on applying the first one-way function, at least once, to the first key component.

Still further in accordance with a preferred embodiment of the present invention the key-component in the second hash-chain for the selected cryptoperiod is determined based on applying the second one-way function, at least once, to the second key component.

Additionally in accordance with a preferred embodiment of the present invention, the cryptographic key is determined by performing a cryptographic hash function on the concatenation of the one key-component in the first hash chain for the selected cryptoperiod with the one key component in the second hash-chain for the selected cryptoperiod.

Moreover, in accordance with a preferred embodiment of the present invention the first one-way function is the same as the second one-way function.

There is also provided in accordance with still another preferred embodiment of the present invention a key production method to determine a cryptographic key for a selected cryptoperiod, the selected cryptoperiod being later than or equal to a cryptoperiod There is also provided in accordance with still another preferred embodiment of the present invention a, and earlier than or equal to a cryptoperiod B, the cryptoperiod There is also provided in accordance with still another preferred embodiment of the present invention a being different from the cryptoperiod B, the method including receiving a first key-component associated with the cryptoperiod There is also provided in accordance with still another preferred embodiment of the present invention a, the first key-component forming part of a first hash-chain having a plurality of key-components such that the first hash-chain progresses via a first one-way function, progressive ones of the key-components in the first hash-chain corresponding to later cryptoperiods, receiving a second key-component associated with the cryptoperiod B, the second key-component forming part of a second hash-chain having a plurality of key-components such that the second hash-chain progresses via a second one-way function, progressive ones of the key-components in the second hash-chain corresponding to earlier cryptoperiods, determining one of the key-components in the first hash-chain for the selected cryptoperiod based on applying the first one-way function, at least once, to the first key component, determining one of the key-components in the second hash-chain for the selected cryptoperiod based on applying the second one-way function, at least once, to the second key component, and determining the cryptographic key based on the one key-component in the first hash chain for the selected cryptoperiod and the one key component in the second hash-chain for the selected cryptoperiod.

There is also provided in accordance with still another preferred embodiment of the present invention a key component production method to determine cryptographic key components for use in determining a cryptographic key for a selected cryptoperiod, the method including determining a first key-component associated with the selected cryptoperiod such that the first key-component forms part of a first hash-chain having a plurality of key-components, the first hash-chain progressing via a first one-way function, progressive ones of the key-components in the first hash-chain corresponding to later cryptoperiods, determining a second key-component associated with the selected cryptoperiod such that the second key-component forms part of a second hash-chain having a plurality of key-components, the second hash-chain progressing via a second one-way function, progressive ones of the key-components in the second hash-chain corresponding to earlier cryptoperiods, determining the cryptographic key for the selected cryptoperiod based on the first key-component and the second key-component, and enabling transfer of the first key-component and the second-key component to a plurality of devices for use in determination of the cryptographic key for the selected cryptoperiod.

BRIEF DESCRIPTION OF THE DRAWINGS

The present invention will be understood and appreciated more fully from the following detailed description, taken in conjunction with the drawings in which:

FIGS. 5-8 are partly pictorial, partly block diagram views illustrating encryption key production in the system of FIG. 4a;

FIGS. 9-12 are partly pictorial, partly block diagram views further illustrating the system of FIG. 4a;

FIG. 13 is a block diagram view of the system of FIG. 4a;

FIG. 14 is a flow diagram of a preferred method of operation of the system of FIG. 4a;

DETAILED DESCRIPTION OF A PREFERRED EMBODIMENT

Figure 1:
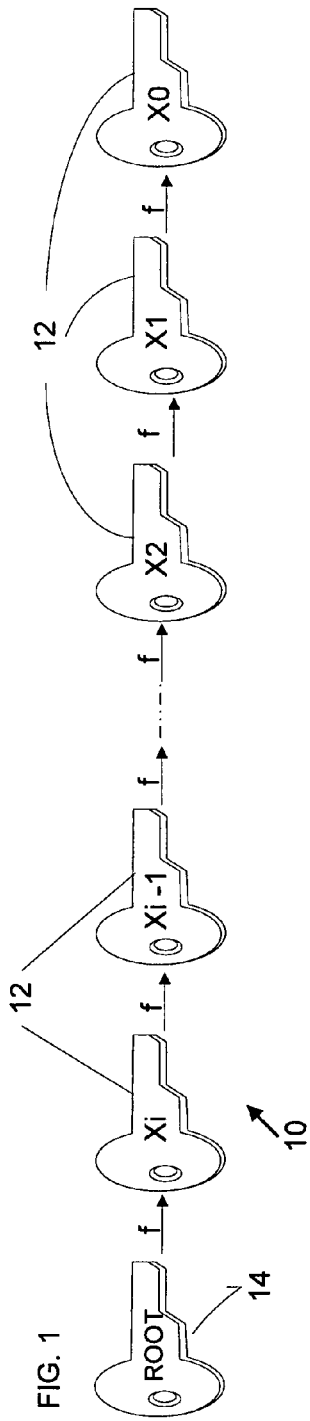
FIG. 1 is a partly pictorial, partly block diagram view of a hash-chain used in key-production.
Figure 2:
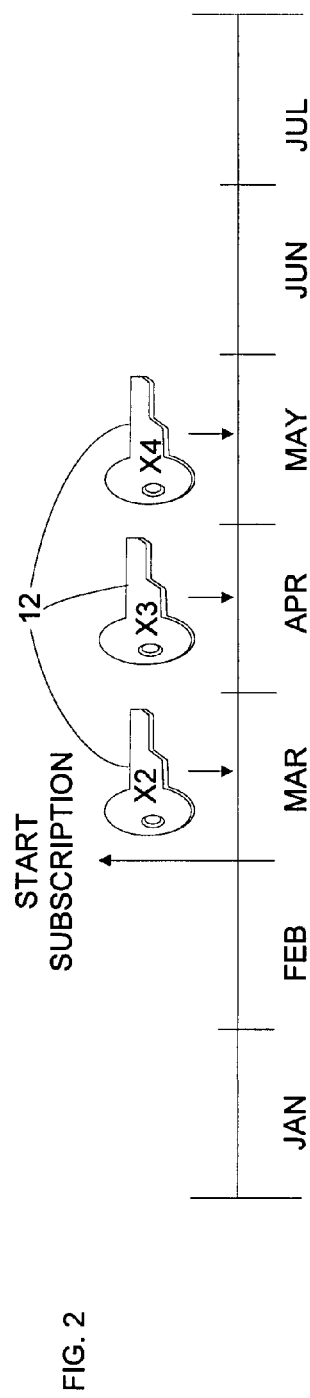
FIG. 2 is a partly pictorial, partly block diagram view of keys being issued after a subscription.
Figure 3:
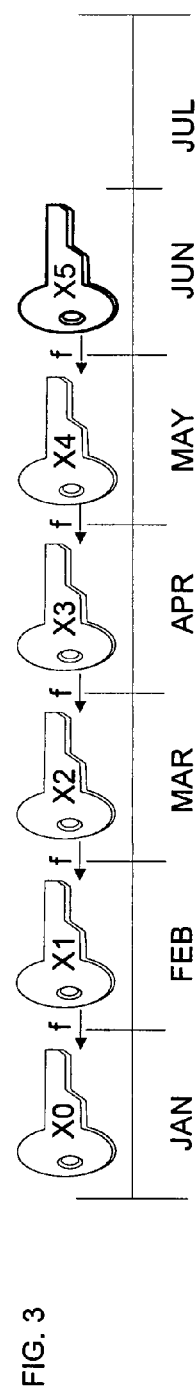
FIG. 3 is a partly pictorial, partly block diagram view of prior keys being generated from a current key.
Figure 4A:
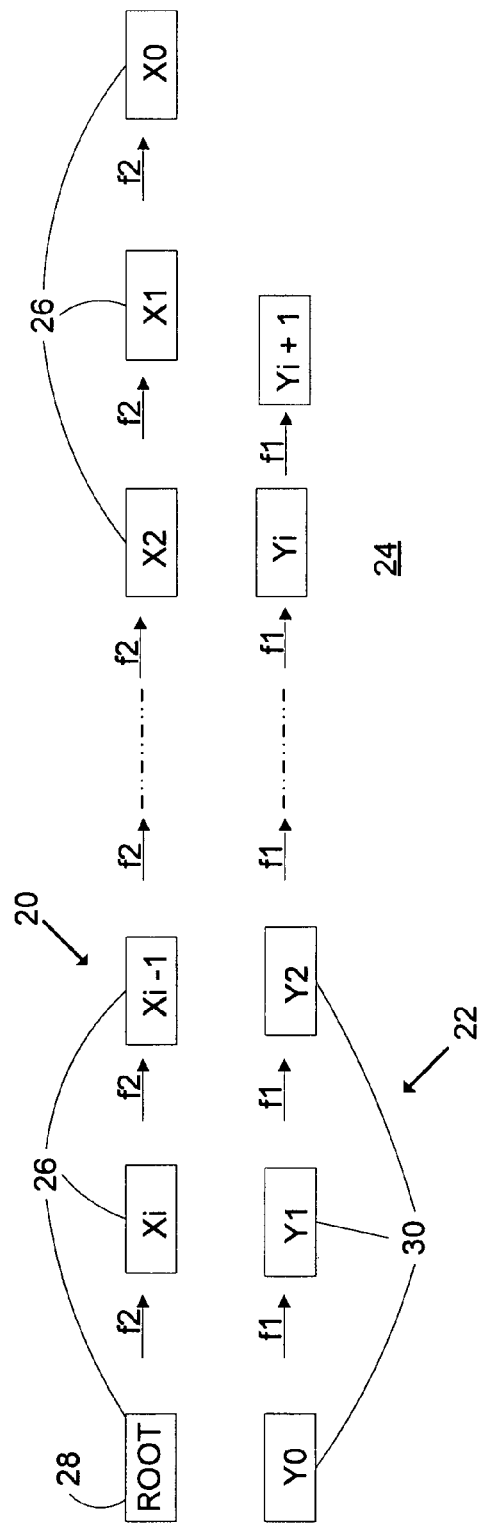
FIG. 4a is a partly pictorial, partly block diagram view of two hash-chains for use with a key production system constructed and operative in accordance with a preferred embodiment of the present invention.

Reference is now made to FIG. 4a, which is a partly pictorial, partly block diagram view of two hash-chains 20, 22 for use with a key production system 24 constructed and operative in accordance with a preferred embodiment of the present invention.

Each hash-chain 20, 22 has values 26, 30, respectively, associated with cryptoperiods, for example, but not limited to, cryptoperiods 0, 1, 2, 3, i–1, i.

The term "cryptoperiod" as used in the specification and claims is defined as a period for which a cryptographic key setting is effective. Progressive cryptoperiods are typically of equal duration, for example, but not limited to, when the cryptoperiods progress in time. However, progressive cryptoperiods may be of unequal duration, such as when the cryptoperiods are associated with stages in a dynamic process which is typically event driven. By way of example, cryptoperiods may be triggered by time, for example, but not to, starting a new cryptoperiod every 10 seconds or every month. By way of another example, new cryptoperiods may be triggered by an event, for example, but not limited to, in a content sharing environment, new cryptoperiods may be triggered when new members are added so that old members can still access old content but the new members cannot access the old content, by way of example.

The hash-chain 22 has a root value, $Y_0$. The other values 30 of the hash-chain 22 are determined by applying a function $f_1$ to the root value, $Y_0$ and subsequent values 30, as necessary. The function $f_1$ is typically a cryptographic one-way function. In practice, a cryptographic Hash-function such as SHA-1 can be used as the function $f_1$.

The term "one-way function" as used in the specification and claims is a function f such that for each x in the domain f, it is easy to compute f(x) (for example using current technology computation is typically in the order of seconds or less); but for essentially all y in the range of f, it is computationally infeasible to find any x such that y=f(x). The term "infeasible" as used in the specification and claims is defined as a problem that while theoretically is possible to solve, in practice is not, due to practical limitations in the amount of time and hardware available. For example only, if a problem can be solved using all the computers in existence working full time the next billion years, that might be considered computationally infeasible. An important property is that advances in technology and theory may well change the definition of what is infeasible.

By way of example only, it is currently believed that it is practically impossible to break the AES (Advanced Encryption Standard) via a brute force attack of exploring all 2 to the power 128 possible keys.

The values 30 (for example, $Y_0, Y_1, Y_2, Y_3$) progress via the function $f_1$, in a direction away from the root value $Y_0$, wherein progressive values 30 correspond to later cryptoperiods, for example, $Y_0$ corresponds to cryptoperiod 0, $Y_1$ corresponds to cryptoperiod 1, and so on (so that the order of issuance is in the same direction as the order of derivation).

It will be appreciated that the value $Y_1$ can be determined from the value $Y_0$ using the function $f_1$. Similarly, the value $Y_2$ can be determined from the value $Y_1$ using the function $f_1$. As the function $f_1$ is a one-way function, it is infeasible to determine the value $Y_0$ from the value $Y_1$, nor the value $Y_1$ from the value $Y_2$.

The hash-chain 20 has a root value 28. The other values 26 of the hash-chain 20 are determined by applying a function $f_2$ to the root value 28 and subsequent values 26, as necessary. The function $f_2$ is typically a cryptographic one-way function. In practice, a cryptographic Hash-function such as SHA-1 can be used for the function $f_2$. The values 26 (for example, $X_3, X_2, X_1, X_0$) progress via the function $f_2$, in a direction away from the root value 28, wherein progressive values 26 correspond to earlier cryptoperiods, for example, $X_3$ corresponds to cryptoperiod 3, $X_2$ to cryptoperiod 2, $X_1$ to cryptoperiod 1 and $X_0$ to cryptoperiod 0 (so that the order of issuance is in the opposite direction to the order of derivation).

It will be appreciated that the value $X_0$ can be determined from the value $X_1$ using the function $f_2$, Similarly, the value $X_1$ can be determined from the value $X_2$ using the function $f_2$, and so on. However, as the function f2 is a one-way function, it is infeasible to determine the value $X_1$ from the value $X_0$, nor the value $X_2$ from the value $X_1$.

Figure 4B:
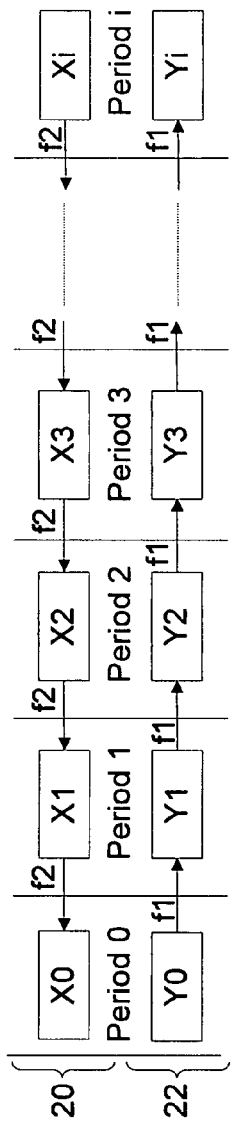
FIG. 4b is a partly pictorial, partly block diagram view of the two-hash chains of FIG. 4a depicted in cryptographic period order.

The hash-chain values 26, 30 are also known as key-components, as the values 26, 30 are typically used in cryptographic key determination, described in more detail with reference to FIGS. 5-14:

FIG. 4b is a partly pictorial, partly block diagram view of the two-hash chains 20, 22 of FIG. 4a depicted in cryptographic period order. The hash-chains 20, 22 progress in different directions with respect to cryptographic period order.

Reference is now made to FIGS. 5-8, which are partly pictorial, partly block diagram views illustrating encryption key production in the key production system 24 of FIG. 4a.

Figure 5:
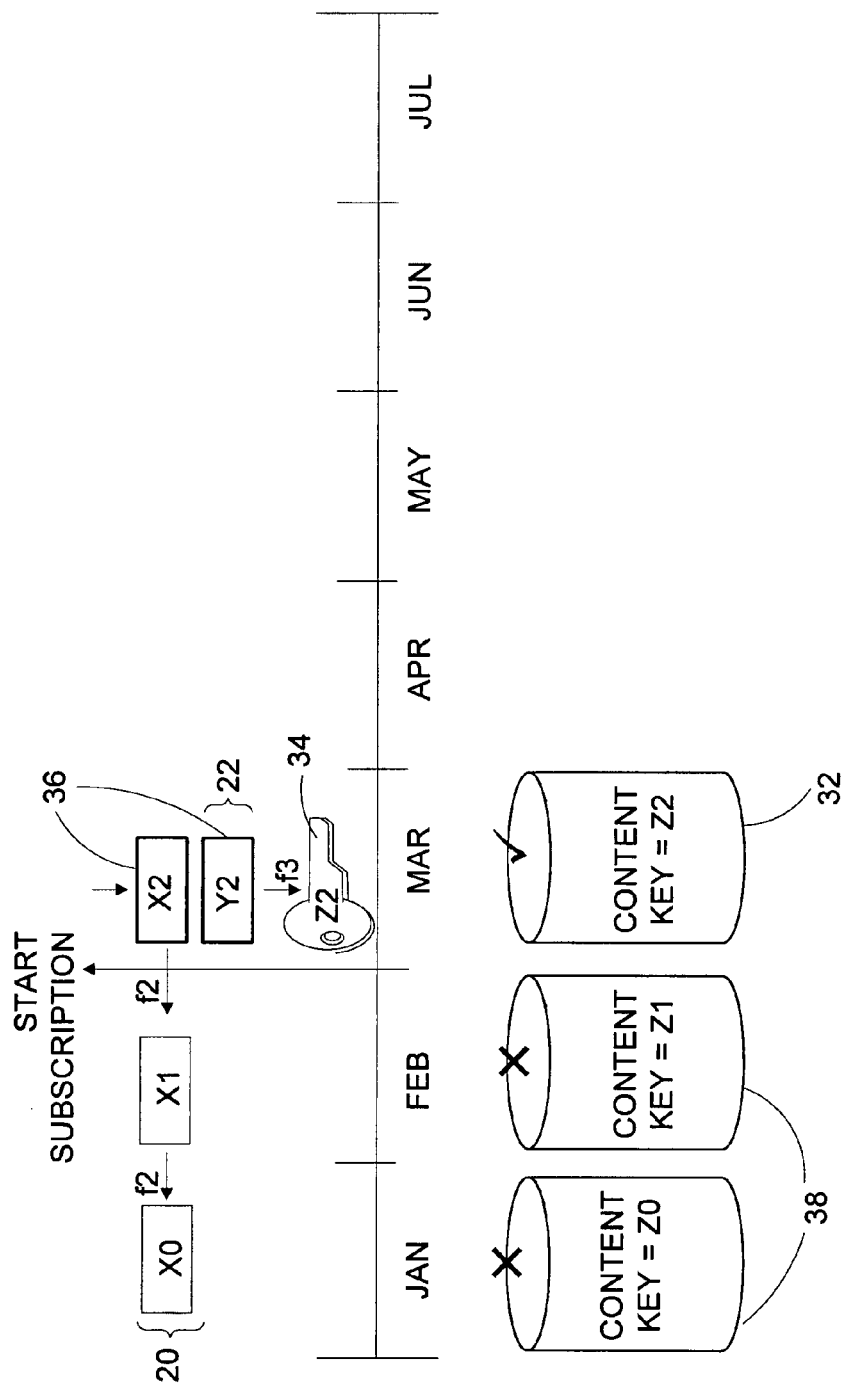

FIG. 5 depicts a subscription of a consumer (not shown) starting in March and receiving, by a device (not shown) of the consumer, a plurality of key-components 36, namely $X_2$ and $Y_2$. $X_2$ is from the hash-chain 20 and $Y_2$ is from the hash-chain 22. A content decryption key 34 for decrypting a plurality of encrypted content items 32 issued in March is $Z_2$. $Z_2$ is determined from $X_2$ and $Y_2$ using a function $f_3$. In general, the function $f_3$ should not allow computing the values $X_i$ from $Z_i$ and $Y_i$ and preferably not $Y_i$ from $Z_i$ and $X_i$, for a cryptoperiod i. By way of example only, in practice a cryptographic hash function that takes the concatenation of $X_i$ with $Y_i$ as input is a good candidate for the function $f_3$. In the example of FIG. 5, the function f3 uses $X_2$ and $Y_2$ as inputs.

Previous values of the key-components in the hash-chain 20, namely $X_1$ and $X_0$ can be derived from $X_2$ by applying the function $f_2$ to $X_2$. However, since it is infeasible to determine the previous values of the key components in the hash-chain 22 namely $Y_1$ and $Y_0$ (not shown) from $Y_2$ as the function $f_1$ is a one-way function, the content decryption keys $Z_0$ and $Z_1$ cannot generally be determined and therefore a plurality of content items 38 issued in January and February encrypted using $Z_0$ and $Z_1$, respectively, cannot generally be decrypted by the device.

Figure 6:
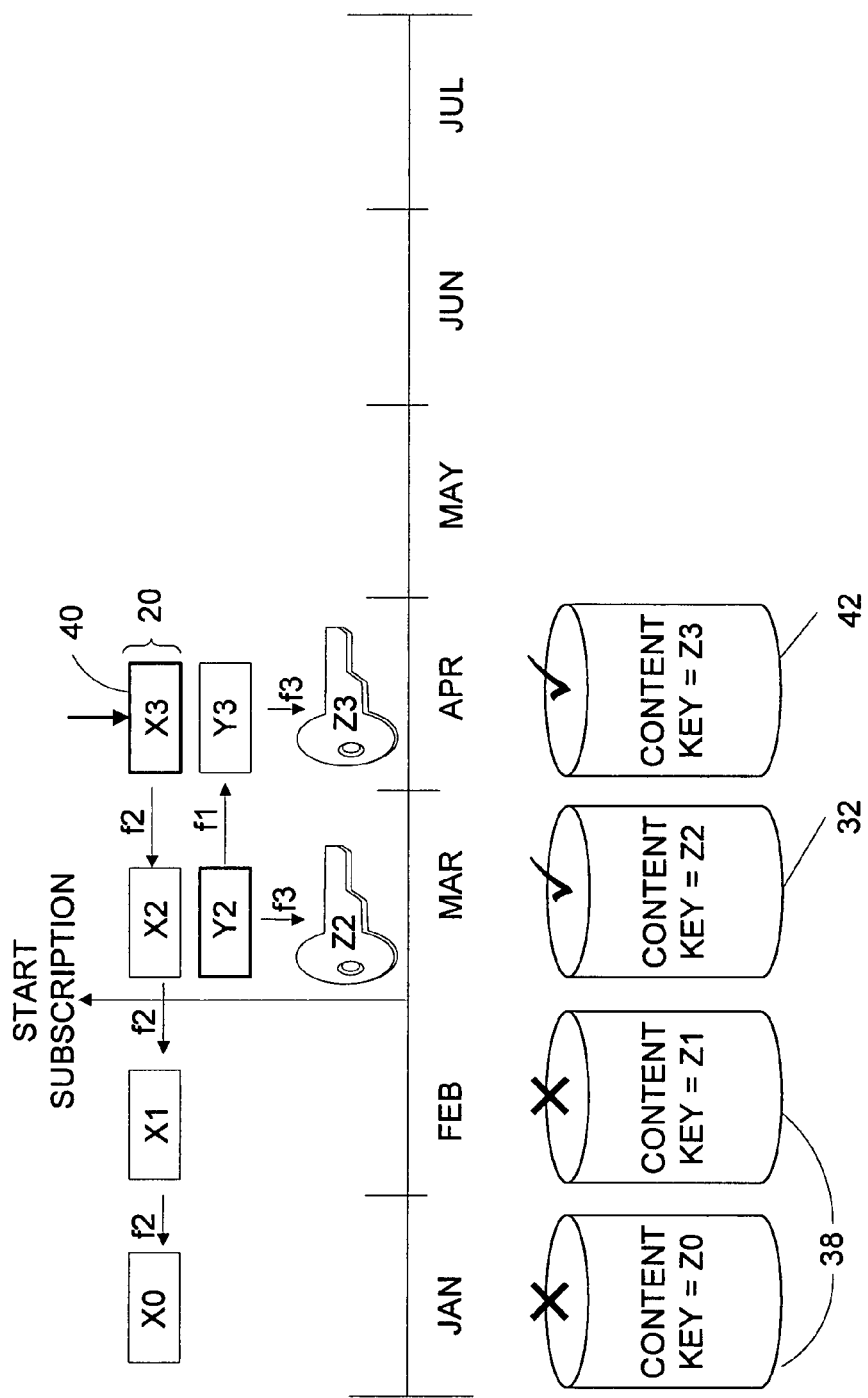

Reference is now made to FIG. 6. In April, a new key-component 40, namely $X_3$, is issued to the device of the consumer for the hash-chain 20. To save storage space, the client only stores $X_3$ and $Y_2$. $X_2$ is derived from $X_3$ using the function $f_2$ applied to $X_3$. $Y_3$ is derived from $Y_2$ using the function $f_1$ applied to $Y_2$. The content decryption key $Z_2$ is determined from $X_2$ and $Y_2$ using the function $f_3$ and a content decryption key $Z_3$ is determined from $X_3$ and $Y_3$ using the function $f_3$. Therefore, the encrypted content items 32 issued in March and a plurality of encrypted content items 42 issued in April may be decrypted by the device using the content decryption keys $Z_2$ and $Z_3$, respectively. As described with reference to FIG. 5 the content 38 cannot generally be decrypted as $Z_0$ and $Z_1$ cannot generally be determined.

Figure 7:
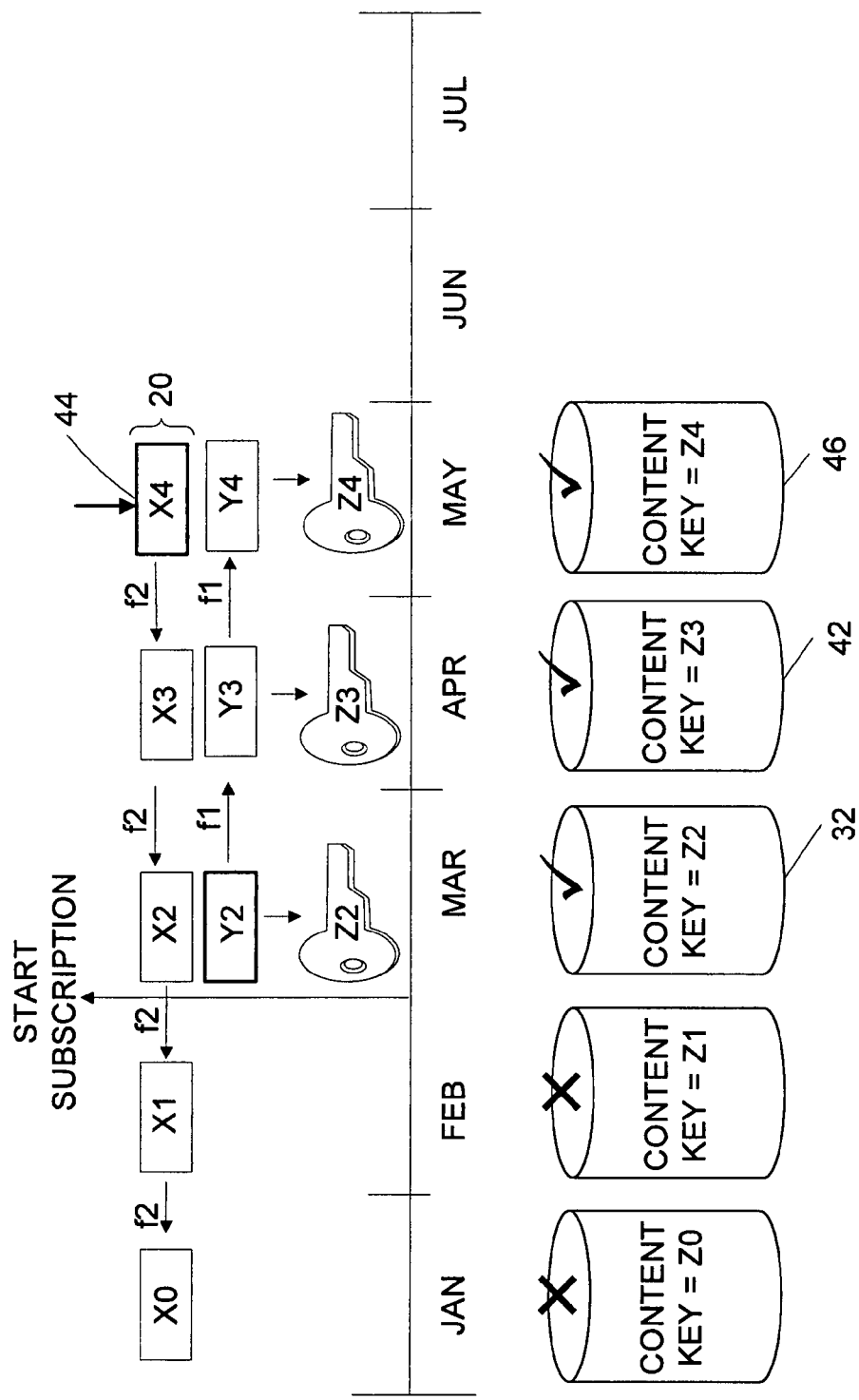

Reference is now made to FIG. 7. In May, a new key-component 44, namely $X_4$, is issued to the device of the consumer for the hash-chain 20. To save storage space, the device only stores $X_4$ and $Y_2$. $X_2$ and $X_3$ are derived from $X_4$ using the function $f_2$. $Y_3$ and $Y_4$ are derived from $Y_2$ using the function $f_1$. Therefore, the content decryption keys $Z_2, Z_3$ and a content decryption key $Z_4$ can be determined from the respective values of X and Y. Therefore, the encrypted content items 32, 42 and a plurality of encrypted content items 46 issued in May can be decrypted by the device using content decryption keys $Z_2, Z_3$ and $Z_4$, respectively.

Figure 8:
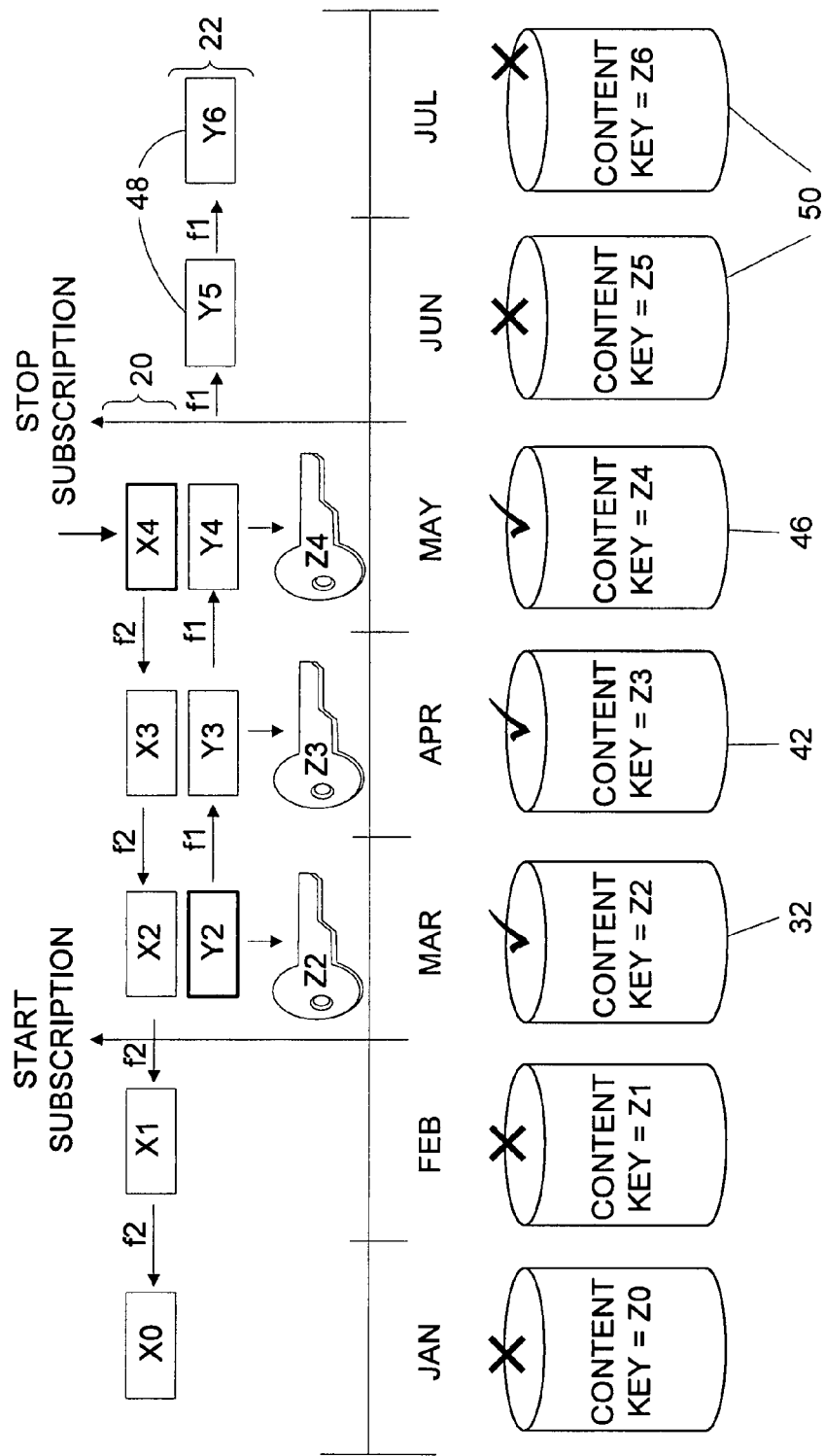

Reference is now made to FIG. 8. The consumer decided not to renew the subscription for June. Therefore, the device of the consumer does not receive any new key-components for June. It is possible to derive a plurality of key components 48, namely, $Y_5$ and $Y_6$, in the hash-chain 22 for June and July, respectively, from $Y_2$ using the function $f_1$. However, as the function $f_2$ is a one-way function, it is infeasible to derive the key-components $X_5$ and $X_6$ (not shown), in the hash-chain 20 for June and July, respectively, from $X_4$. Therefore, decryption keys $Z_5$ and $Z_6$ for decrypting a plurality of encrypted content items 50 issued in June and July, respectively, generally cannot be determined.

As described above with reference to FIG. 7, the encrypted content items 32, 42, 46 can still be decrypted, as the decryption keys $Z_2$, $Z_3$ and $Z_4$ can be determined using the key-components $Y_2$ and $X_4$, as well as from the key-components $X_2$, $X_3$, $Y_3$, $Y_4$ derived from $Y_2$ and $X_4$.

Reference is now made to FIGS. 9-12, which are partly pictorial, partly block diagram views further illustrating the key production system 24 of FIG. 4a.

Figure 9:
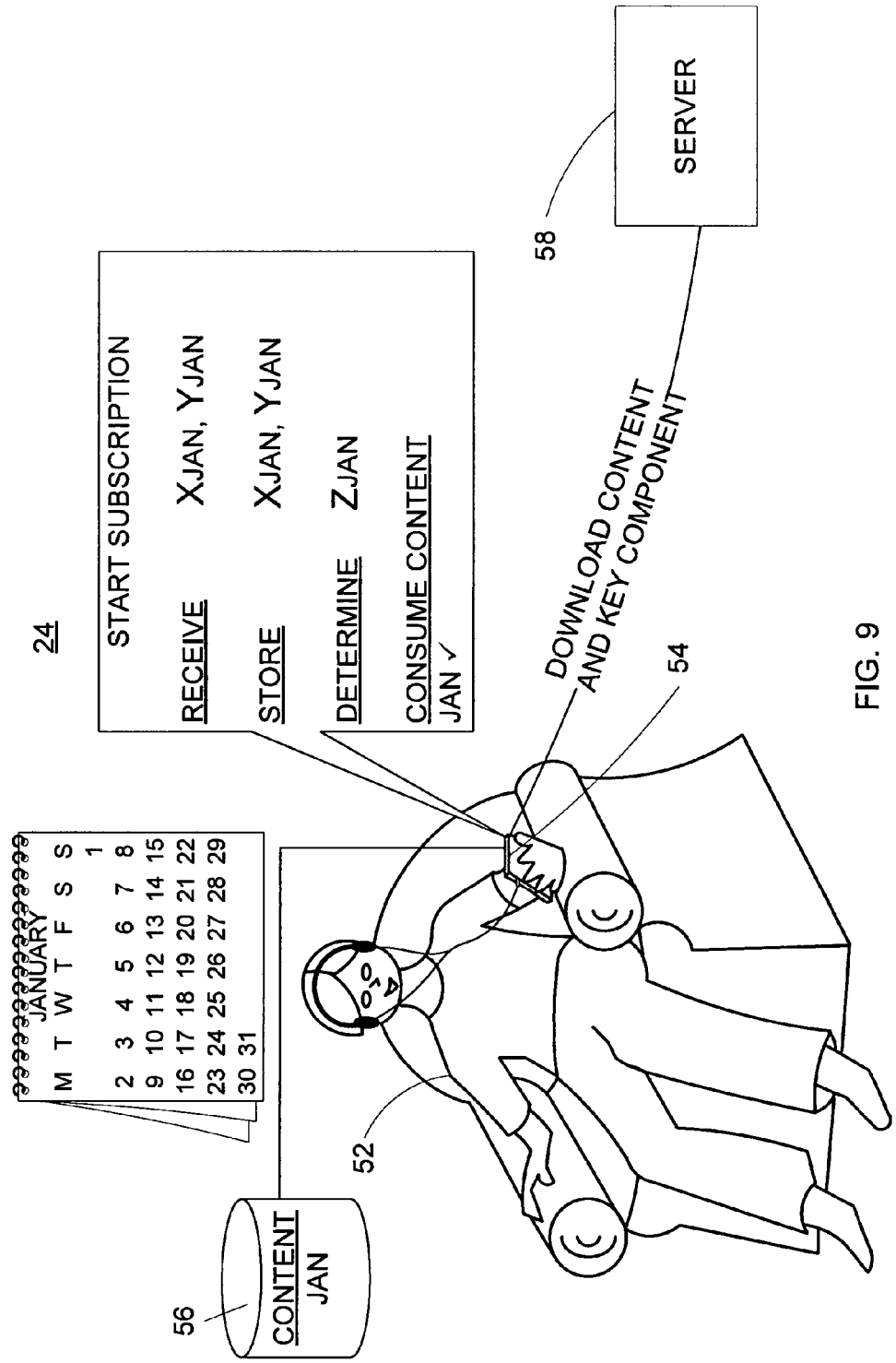

FIG. 9 depicts a consumer 52 having a device 54 for consuming a plurality of content items 56. The device 54 may be any suitable consuming device, for example, but not limited to, a portable music player, portable TV, desktop computer, portable computer, a set-top box, or any other suitable portable or non-portable device.

In January, the consumer 52 starts subscribing to a service for receiving the content items 56. The content items 56 issued in January are encrypted using a key $Z_{JAN}$. The device 54 downloads, from a server 58, a plurality of key components, namely $X_{JAN}$ and $Y_{JAN}$, associated with the hash-chain 20 (FIG. 4a) and the hash-chain 22 (FIG. 4a), respectively. The device 54 also downloads, from the server 58, the content items 56 issued in January. The key $Z_{JAN}$ is determined by the device 54 from $X_{JAN}$ and $Y_{JAN}$. The key $Z_{JAN}$ is then used to decrypt the content items 56.

Encrypted content issued prior to January cannot generally be decrypted, as it is infeasible to determine values earlier than $Y_{JAN}$ as the function $f_1$ is a one-way function.

Figure 10:
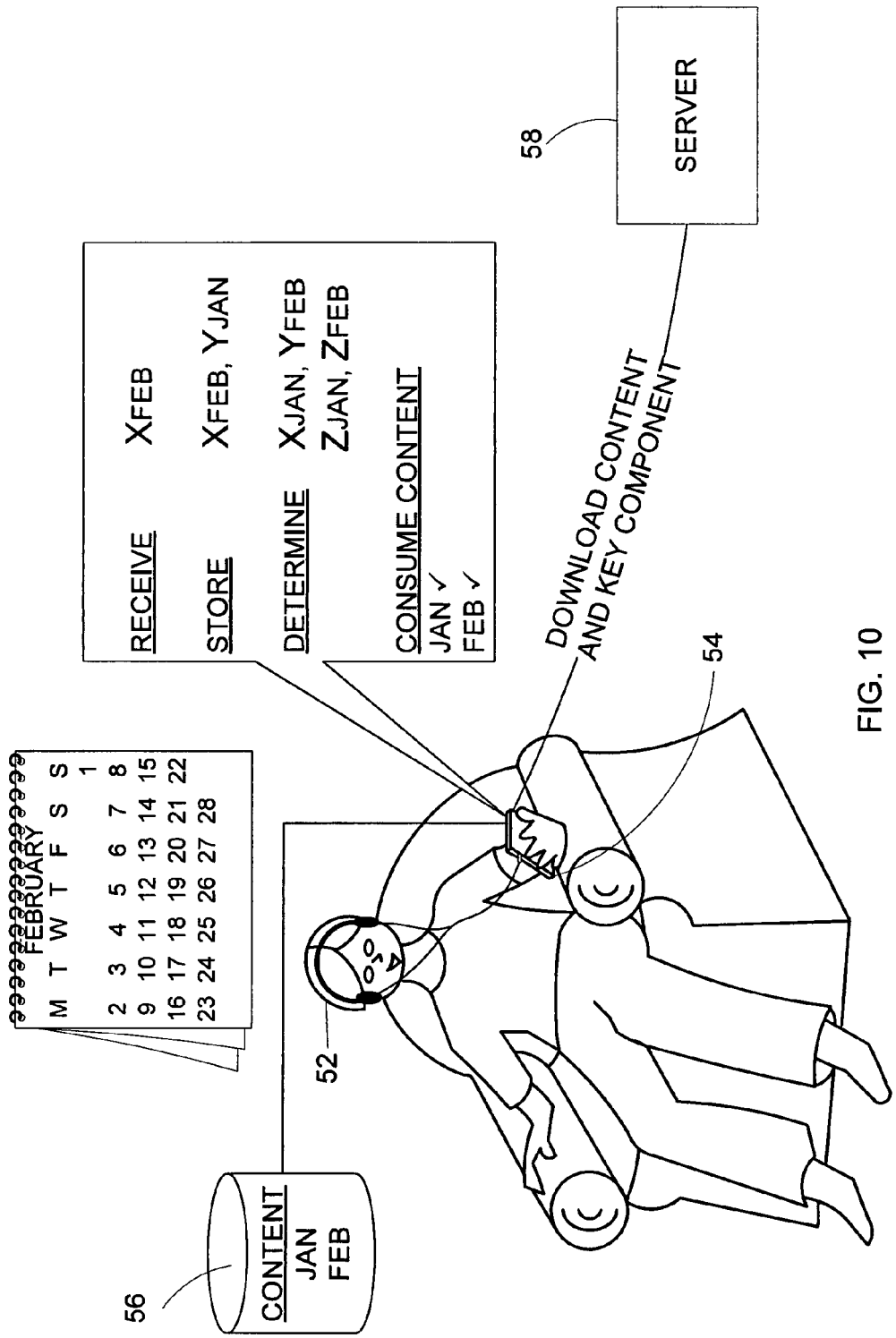

Reference is now made to FIG. 10. In February, the device 54 downloads, from the server 58, a key component $X_{FEB}$ and the content items 56 issued in February encrypted with a key $Z_{FEB}$. The key $Z_{FEB}$ is determined by the device 54 based on $X_{FEB}$ and $Y_{FEB}$ which is derived from $Y_{JAN}$ using the function $f_1$. Even though $X_{FEB}$ and $Y_{JAN}$ are the only key-components still being stored by the device 54, $Z_{JAN}$ can still be determined by deriving $X_{JAN}$ from $X_{FEB}$ using the function $f_2$. Therefore, both the content items 56 issued in January and February can be played by the consumer 52 on the device 54.

Figure 11:
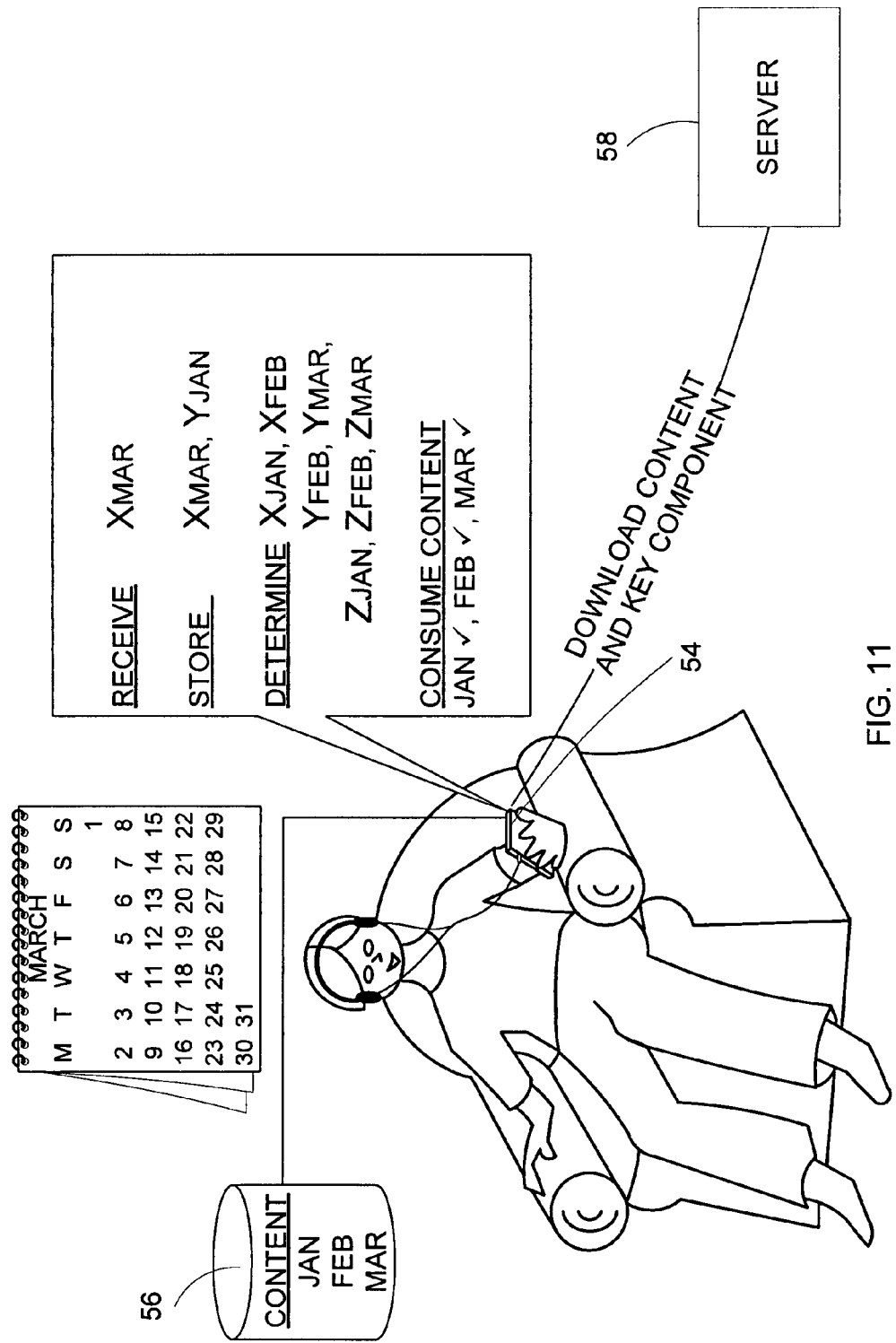

Reference is now made to FIG. 11. In March, the device 54 downloads, from the server 58, a key component $X_{MAR}$ and the content items 56 issued in March encrypted with a key $Z_{MAR}$. The key ZMAR is determined by the device 54 from $X_{MAR}$ and $Y_{MAR}$ which is derived from $Y_{JAN}$ using the function f2.

Figure 12:
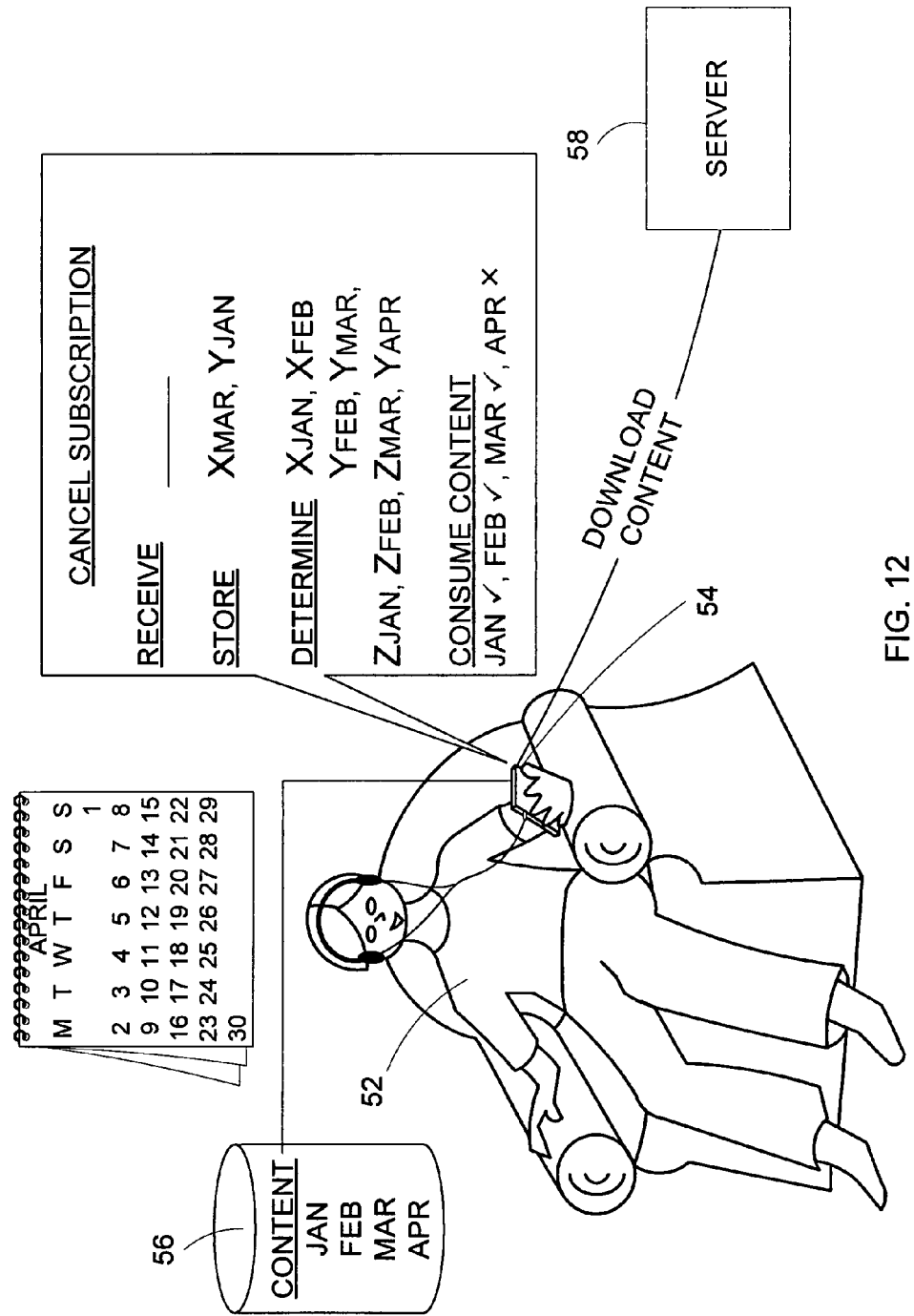

Reference is now made to FIG. 12. The consumer 52 decided not to renew the subscription in April. Nevertheless, the user downloads, from the server 58, the content items 56 issued in April encrypted with a key $Z_{APR}$. Although the device 54 may determine $Y_{APR}$ based on $Y_{JAN}$ using the function $f_1$, it is infeasible for the device 54 to determine $X_{APR}$ from $X_{MAR}$ as the function $f_2$ is a one-way function. Therefore, the device 54 cannot generally determine $Z_{APR}$ nor decrypt the content items 56 issued in April.

In the above examples of FIGS. 5-12, the subscribers are restricted to accessing content encrypted using keys associated with the subscription period. However, access to content encrypted prior to the encryption period may be allowed by supplying the subscribers with earlier keys in the hash-chain 22 for example, by supplying the consumer 52 of FIGS. 9-12 with a key component before $Y_{JAN}$ or supplying the subscriber of FIGS. 5-8 with the key component $Y_0$ or $Y_1$, by way of example only.

It should be noted that it is desirable to start a new chain in place of the hash-chain 22 occasionally, as hackers may try to combine key-components that they receive in order to be able to construct keys for cryptoperiods for which the users are not subscribed.

Figure 14:
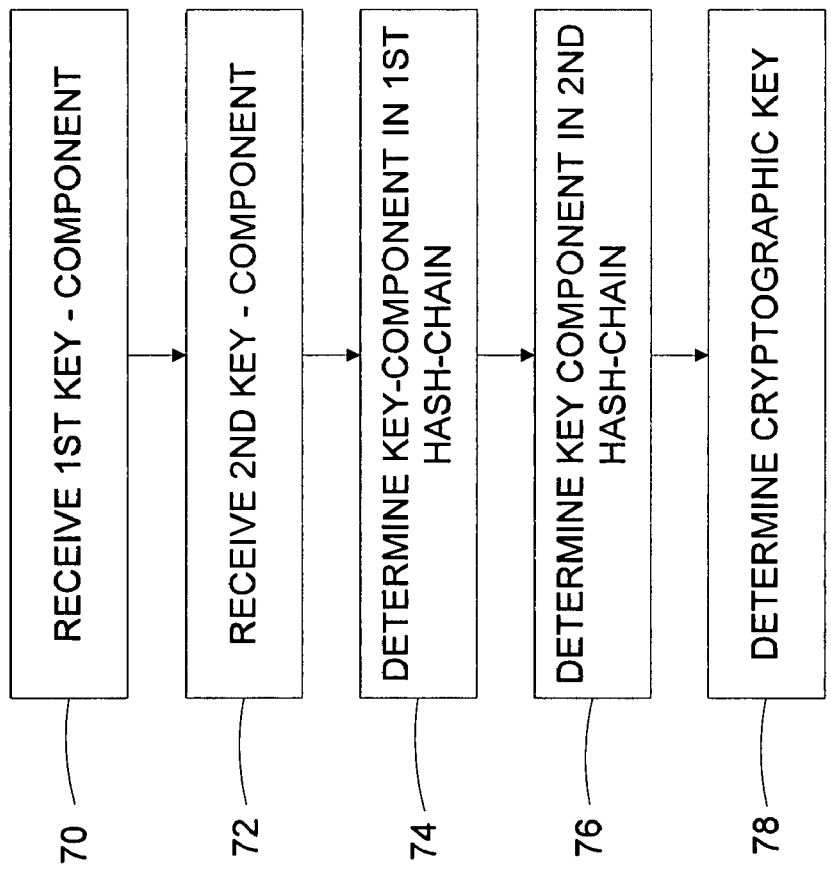
Figure 13:
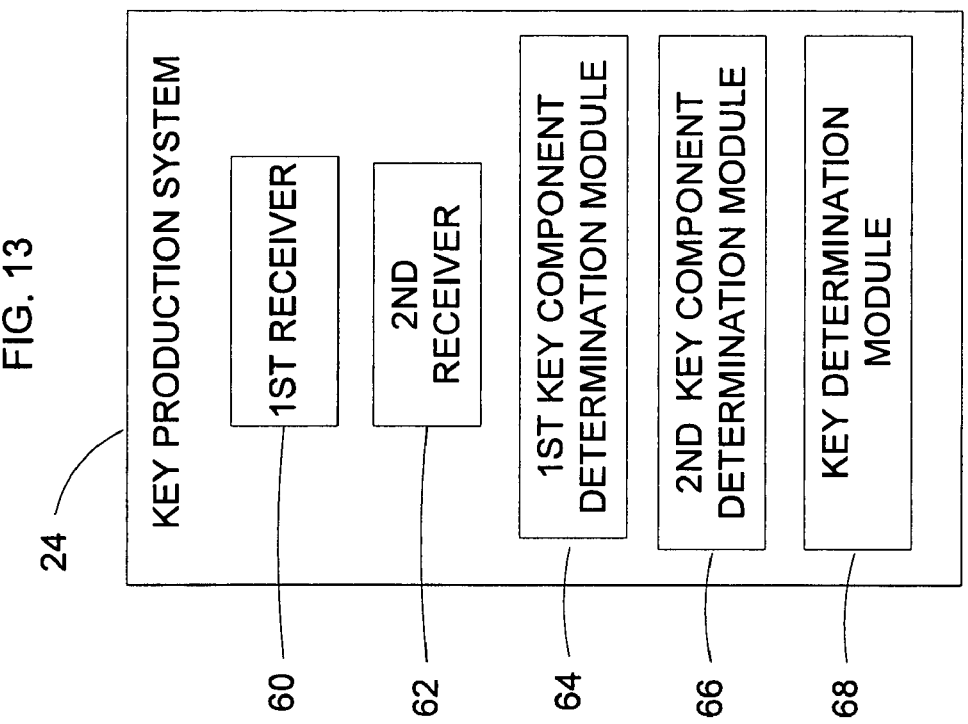

Reference is now made to FIGS. 13 and 14. FIG. 13 is a block diagram view of the key production system 24 of FIG. 4a. FIG. 14 is a flow diagram of a preferred method of operation of the key production system 24 of FIG. 4a.

The key production system 24 is preferably operative to determine a cryptographic key for a selected cryptoperiod. The selected cryptoperiod is typically later than, or equal to, a cryptoperiod A and earlier than, or equal to, a cryptoperiod B. The cryptoperiod A may be the same as, or different from, the cryptoperiod B.

The key production system 24 preferably includes a first receiver 60, a second receiver 62, a first key component determination module 64, a second key component determination module 66 and a key determination module 68.

The first receiver 60 is preferably operative to receive a first key-component associated with the cryptoperiod A. The first key-component typically forms part of a first hash-chain having a plurality of key-components such that the first hash-chain progresses via a first one-way function. Progressive key-components in the first hash-chain correspond to later cryptoperiods (block 70).

The second receiver 62 is preferably operative to receive a second key-component associated with the cryptoperiod B. The second key-component typically forms part of a second hash-chain having a plurality of key-components such that the second hash-chain progresses via a second one-way function. Progressive key-components in the second hash-chain correspond to earlier cryptoperiods (block 72).

When the selected cryptoperiod is not equal to the cryptoperiod A, the first key component determination module 64 is preferably operative to determine the key-component in the first hash-chain for the selected cryptoperiod based on applying the first one-way function, at least once (as many times as necessary), to the first key component (block 74).

When the selected cryptoperiod is not equal to the cryptoperiod B, the second key component determination module 66 is preferably operative to determine the key-component in the second hash-chain for the selected cryptoperiod based on applying the second one-way function, at least once (as many times as necessary), to the second key component (block 76).

The first one-way function may be the same as, or different from, the second one-way function.

The key determination module 68 is preferably operative to determine the cryptographic key based on the key-component in the first hash chain for the selected cryptoperiod and the key component in the second hash-chain for the selected cryptoperiod (block 78).

In accordance with a most preferred embodiment of the present invention, the key determination module 68 is preferably operative to determine the cryptographic key using a function (for example the function $f_3$ described with reference to FIG. 5) with the key-component in the first hash chain for the selected cryptoperiod and the key component in the second hash-chain for the selected cryptoperiod as input.

Figure 16:
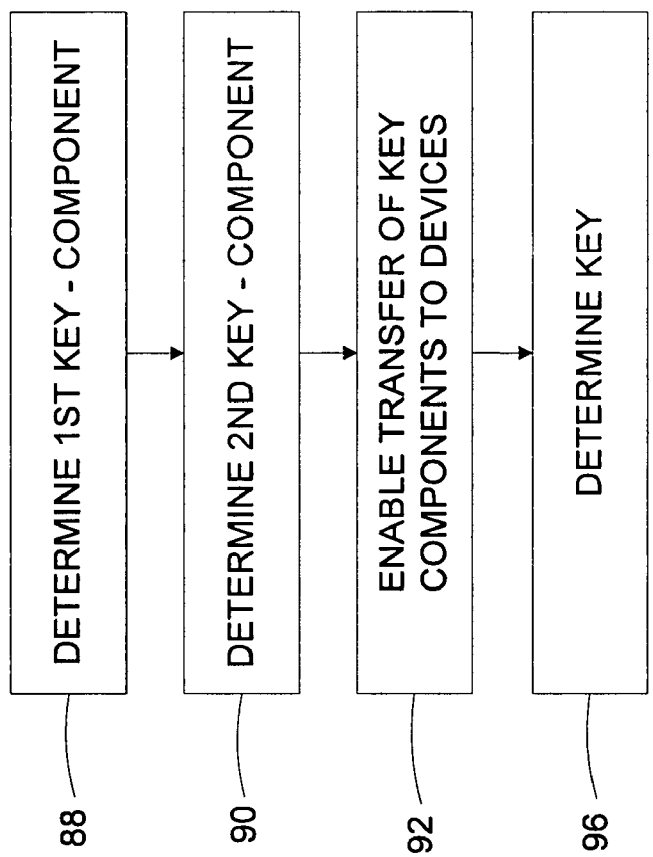
FIG. 16 is a flow diagram of a preferred method of operation of the system of FIG. 15.
Figure 15:
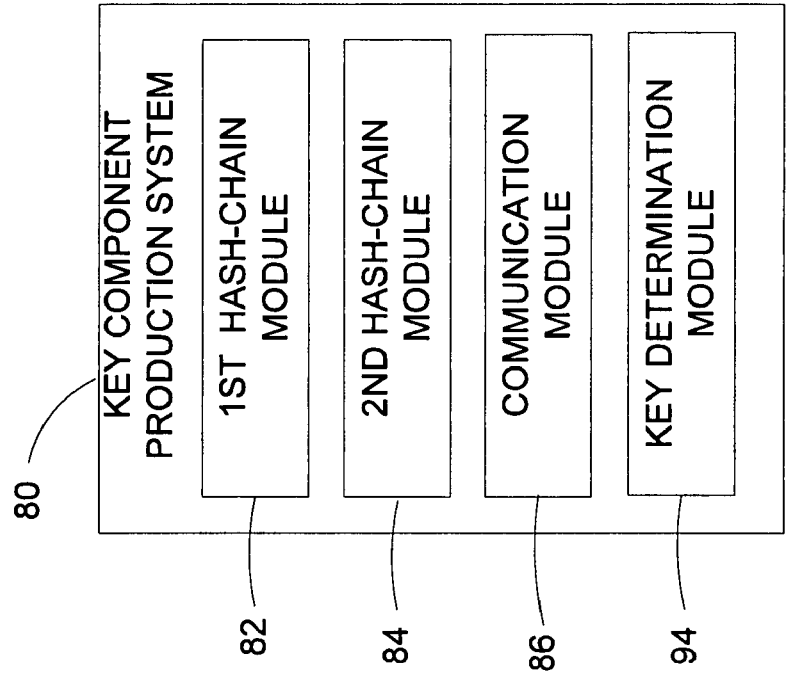
FIG. 15 is a block diagram view of a key component production system constructed and operative in accordance with a preferred embodiment of the present invention.

By way of introduction, the key components for a selected cryptoperiod received by the subscriber devices (for example, the device 54 of FIGS. 9-12) are typically determined by a server (for example, the server 58 of FIGS. 9-12). The key components are then generally broadcast or pushed by the server or downloaded from the server by the subscriber devices. The server typically includes a key component production system 80, which is now described in more detail with reference to FIGS. 15 and 16. FIG. 15 is a block diagram view of the key component production system 80 constructed and operative in accordance with a preferred embodiment of the present invention. FIG. 16 is a flow diagram of a preferred method of operation of the system 80 of FIG. 15.

The key component production system 80 preferably includes a first hash-chain module 82, a second hash-chain module 84, a communication module 86 and a key determination module 94.

The first hash-chain module 82 is preferably operative to determine a first key-component associated with the selected cryptoperiod such that the first key-component forms part of a first hash-chain having a plurality of key-components (block 88). The first hash-chain progresses via a first one-way function. Progressive key-components in the first hash-chain correspond to later cryptoperiods.

The second hash-chain module 84 is preferably operative to determine a second key-component associated with the selected cryptoperiod such that the second key-component forms part of a second hash-chain having a plurality of key-components. The second hash-chain progresses via a second one-way function. Progressive ones of the key-components in the second hash-chain correspond to earlier cryptoperiods (block 90).

The communication module 86 is preferably operative to enable transfer of the first key-component and the second-key component to a plurality of devices for use in determination of the cryptographic key for the selected cryptoperiod. The communication module 86 typically broadcasts or pushes the key-components to the devices (for example, but not limited to, sending the key-components in an SMS message to mobile subscriber devices) or allows the key-components to be downloaded by the devices (block 92).

The key determination module 94 is preferably operative to determine the cryptographic key for the selected cryptoperiod based on the first key-component and the second key-component. The cryptographic key is then typically used to encrypt content for consumption by the subscriber devices (block 96).

It is appreciated that present invention may be implemented in software, ROM (read only memory) form, or hardware, if desired, using conventional techniques, or any suitable combination thereof.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove. Rather the scope of the invention is defined only by the claims which follow.

What is claimed is:

1. A system to determine a decryption key for a cryptoperiod C selected from a plurality of cryptoperiods indexed i, the cryptoperiod C being equal to a cryptoperiod A or a cryptoperiod B or a cryptoperiod between the cryptoperiod A and the cryptoperiod B, the cryptoperiod A being different from the cryptoperiod B, the system comprising:

a physical computing device configured to:
receive a key-component A-1 associated with the cryptoperiod A, the key-component A-1 forming part of a first hash-chain having a plurality of Y-key-components $Y_i$, the index i of $Y_i$ indicating which one of the plurality of cryptoperiods i is assigned to $Y_i$, the Y-key-components progressing from $Y_i$ to $Y_{i+1}$ away from a root via a one-way function f1, the plurality of Y-key-components assigned to the plurality of cryptoperiods i with progressive Y-key-components assigned to later cryptoperiods;

receive a key-component B-2 associated with the cryptoperiod B, the key-component B-2 forming part of a second hash-chain having a plurality of X-key-components $X_i$, the index i of $X_i$ indicating which one of the plurality of cryptoperiods i is assigned to $X_i$, the X-key-components progressing from $X_i$ to $X_{i-1}$ away from a root via a one-way function f2, the plurality of X-key-components assigned to the same plurality of cryptoperiods i with progressive X-key-components assigned to earlier cryptoperiods;

determine a key component C-1 in the first hash-chain for the cryptoperiod C;

determine a key-component C-2 in the second hash-chain for the cryptoperiod C; and determine the decryption key for the cryptoperiod C based on the key component C-1 and the key component C-2; and a consumer device to decrypt content using the decryption key for the cryptoperiod C.

2. The system according to claim 1, wherein the physical computing device is operative to determine the key-component C-1 in the first hash-chain for the cryptoperiod C based on applying the one-way function f1, at least once, to the key component A-1.

3. The system according to claim 1, wherein the physical computing device is operative to determine the key-component C-2 in the second hash-chain for the cryptoperiod C based on applying the one-way function f2, at least once, to the key component B-2.

4. The system according to claim 1, wherein the physical computing device is operative to determine the decryption key by performing a cryptographic hash function on the concatenation of the key-component C-1 with the key component C-2.

5. The system according to claim 1, wherein the one-way function f1 is the same as the one-way function 12.

6. A key component production system to determine cryptographic key components for use in determining a cryptographic key for a cryptoperiod C selected from a plurality of cryptoperiods, indexed i, the system comprising:

a physical computing device configured to:
determine a key-component C-1 associated with the cryptoperiod C such that the key-component C-1 forms part of a first hash-chain having a plurality of Y-key-components $Y_i$, the index i of $Y_i$ indicating which one of the plurality of cryptoperiods i is assigned to $Y_i$, the Y-key components progressing from $Y_i$ to $Y_{i+1}$ away from a root via a one-way function f1, the plurality of Y-key-components assigned to the plurality of cryptoperiods i with progressive Y-key-components assigned to later cryptoperiods;

determine a key-component C-2 associated with the cryptoperiod C such that the key-component C-2 forms part of a second hash-chain having a plurality of X-key-components $X_i$, the index i of $X_i$ indicating which one of the plurality of cryptoperiods i is assigned to $X_i$, the X-key components progressing from $X_i$ to $X_{i-1}$ away from the root via a one-way function f2, the plurality of X-key components assigned to the same plurality of cryptoperiods i with progressive X-key-components assigned to earlier cryptoperiods;

determine the cryptographic key for the cryptoperiod C based on the key-component C-1 and the key-component C-2; and enable transfer of the key-component C-1 and the key component C-2 to a plurality of consumer devices for use in determination of the cryptographic key for the cryptoperiod C.

7. A method to determine a decryption key for a cryptoperiod C selected from a plurality of cryptoperiods indexed i, the cryptoperiod C being equal to a cryptoperiod A or a cryptoperiod B or a cryptoperiod between the cryptoperiod A and the cryptoperiod B, the cryptoperiod A being different from the cryptoperiod B, the method comprising receiving, by a physical computing device, a key-component A-1 associated with the cryptoperiod A, the key-component A-1 forming part of a first hash-chain having a plurality of Y-key-components $Y_i$, the index i of $Y_i$ indicating which one of the plurality of cryptoperiods i is assigned to $Y_i$, the Y-key components progressing from $Y_i$ to $Y_{i+1}$ away from a root via a one-way function f1, the plurality of Y-key-components assigned to the plurality of cryptoperiods i with progressive Y-key-components assigned to later cryptoperiods;

receiving, by the physical computing device, a key-component B-2 associated with the cryptoperiod B, the key-component B2 forming part of a second hash-chain having a plurality of X-key-components $X_i$, the index i of $X_i$ indicating which one of the plurality of cryptoperiods i is assigned to $X_i$, the X-key components progressing from $X_i$ to $X_{i-1}$ away from a root via a one-way function f2, the plurality of X-key-components assigned to the plurality of cryptoperiods i with progressive ones of the X-key-components assigned to earlier cryptoperiods;

determining, by the physical computing device, a key-component C-1 in the first hash-chain for the cryptoperiod C;

determining, by the physical computing device, a key component C-2 in the second hash-chain for the cryptoperiod C; and determining, by the physical computing device, the decryption key for the cryptoperiod C based on the key-component C-1 and the key component C-2; and decrypting, by the physical computing device, content using the decryption key for the cryptoperiod C.

8. The method according to claim 7, wherein the key-component C-1 in the first hash chain for the cryptoperiod C is determined, by the physical computing device, based on applying the one-way function f1, at least once, to the key component A-1.

9. The method according to claim 7, wherein the key-component C-2 in the second hash-chain for the cryptoperiod C is determined, by the physical computing device, based on applying the one-way function C, at least once, to the key component B-2.

10. The method according to claim 7, wherein the decryption key is determined, by the physical computing device, by performing a cryptographic hash function on the concatenation of the key-component C-1 with the key component C-2.

11. The method according to claim 7, wherein the one-way function f1 is the same as the one-way function f2.

12. A key component production method to determine cryptographic key components for use in determining a cryptographic key for a cryptoperiod C selected from a plurality of cryptoperiods, indexed i, the method comprising:

determining, by a physical computing device, a key-component C-1 associated with the cryptoperiod C such that the key-component C-1 forms part of a first hash-chain having a plurality of Y-key-components $Y_i$, the index i of $Y_i$ indicating which one of the plurality of cryptoperiods i is assigned to $Y_i$, the Y-key-components progressing from $Y_i$ to $Y_{i+i}$ away from a root via a one-way function f1, the plurality of Y-key-components assigned to the plurality of cryptoperiods i with progressive Y-key-components assigned to later cryptoperiods;

determining, by the physical computing device, a key-component C-2 associated with the cryptoperiod C such that the key-component C-2 forms part of a second hash-chain having a plurality of X-key-components $X_i$, the index i of $X_i$ indicating which one of the plurality of cryptoperiods i is assigned to $X_i$, the X-key components progressing from $X_i$ to $X_{i-1}$ away from the root via a one-way function f2, the plurality of X-key components assigned to the same plurality of cryptoperiods i with progressive X-key-components assigned to earlier cryptoperiods;

determining, by the physical computing device, the cryptographic key for the cryptoperiod C based on the key-component C-1 and the key-component C-2; and enabling transfer, by the physical computing device, of the key-component C-1 and the key component C-2 to a plurality of consumer devices for use in determination of the cryptographic key for the selected cryptoperiod C.

13. A system to determine a decryption key for a cryptoperiod C selected from a plurality of cryptoperiods indexed i, the cryptoperiod C being equal to a cryptoperiod A or a cryptoperiod B or a cryptoperiod between the cryptoperiod A and the cryptoperiod B, the cryptoperiod A being different from the cryptoperiod B, the system comprising:

means for receiving a key-component A-1 associated with the cryptoperiod A, the key-component A-1 forming part of a first hash-chain having a plurality of Y-key-components $Y_i$, the index i of $Y_i$ indicating which one of the plurality of cryptoperiods i is assigned to $Y_i$, the Y-key-components progressing from $Y_i$ to $Y_{i+1}$ away from a root via a one-way function f1, the plurality of Y-key-components assigned to the plurality of cryptoperiods i with progressive Y-key-components assigned to later cryptoperiods;

means for receiving a key-component B-2 associated with the cryptoperiod B, the key-component B-2 forming part of a second hash-chain having a plurality of X-key-components $X_i$, the index i of $X_i$ indicating which one of the plurality of cryptoperiods i is assigned to $X_i$, the X-key-components progressing from $X_i$ to $X_{i-1}$ away from a root via a one-way function f2, the plurality of X-key-components assigned to the same plurality of cryptoperiods i with progressive X-key-components assigned to earlier cryptoperiods;

means for determining a key component C-1 in the first hash-chain for the cryptoperiod C;

means for determining a key-component C-2 in the second hash-chain for the cryptoperiod C;

means for determining the decryption key for the cryptoperiod C based on the key component C-1 and the key component C-2; and means for decrypting content using the decryption key for the cryptoperiod C.

14. A key component production system to determine cryptographic key components for use in determining a cryptographic key for a cryptoperiod C selected from a plurality of cryptoperiods, indexed i, the system comprising:

means for determining a key-component C-1 associated with the cryptoperiod C such that the key-component C-1 forms part of a first hash-chain having a plurality of Y-key-components $Y_i$, the index i of $Y_i$ indicating which one of the plurality of cryptoperiods i is assigned to $Y_i$, the Y-key components progressing from $Y_i$ to $Y_{i+1}$ away from a root via a one-way function f1, the plurality of Y-key-components assigned to the plurality of cryptoperiods i with progressive Y-key-components assigned to later cryptoperiods;

means for determining a key-component C-2 associated with the cryptoperiod C such that the key-component C-2 forms part of a second hash-chain having a plurality of X-key-components $X_i$, the index i of $X_i$ indicating which one of the plurality of cryptoperiods i is assigned to $X_i$, the X-key components progressing from $X_i$ to $X_{i-1}$ away from the root via a one-way function f2, the plurality of X-key components assigned to the same plurality of cryptoperiods i with progressive X-key-components assigned to earlier cryptoperiods;

means for determining the cryptographic key for the cryptoperiod C based on the key-component C-1 and the key-component C-2; and means for enabling transfer of the key-component C-1 and the key component C-2 to a plurality of consumer devices for use in determination of the cryptographic key for the cryptoperiod C.

* * * * *

UNITED STATES PATENT AND TRADEMARK OFFICE
CERTIFICATE OF CORRECTION

| | |
|---|---|
| PATENT NO. | : 7,903,820 B2 |
| APPLICATION NO. | : 11/810023 |
| DATED | : March 8, 2011 |
| INVENTOR(S) | : Erez Waisbard |

It is certified that error appears in the above-identified patent and that said Letters Patent is hereby corrected as shown below:

a. please add --and PCT unpublished patent application IL 2007/00083, both-- immediately after "174494" in column 2, line 16.

b. please delete "function 12" and insert therefor --function f2-- in column 12, line 39 (end of claim 5).

c. please delete "function C," and insert therefor --function f2,-- in column 13, line 50 (fourth line of claim 9).

d. please delete "$Y_i$ to $Y_{i+i}$" and insert therefor --$Y_i$ to $Y_{i+1}$-- in column 14, line 1 (eleventh line of claim 12).

Signed and Sealed this
Tenth Day of May, 2011

David J. Kappos
*Director of the United States Patent and Trademark Office*